(Specimens.)
J. M. HAMMILL.
NON CONDUCTING COMPOUND.
No. 286,922. Patented Oct. 16, 1883.
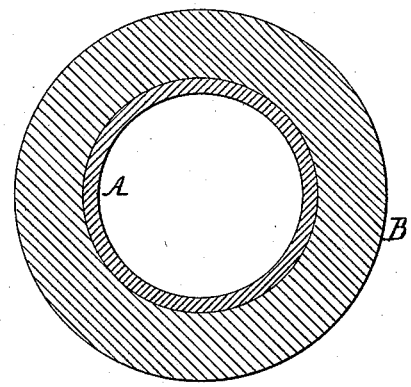

UNITED STATES PATENT OFFICE.

JOSHUA M. HAMMILL, OF PHILADELPHIA, PENNSYLVANIA, ASSIGNOR TO JAMES BOYD, OF SAME PLACE.

NON-CONDUCTING COMPOUND.

SPECIFICATION forming part of Letters Patent No. 286,922, dated October 16, 1883.

Application filed July 20, 1883. (Specimens.)

*To all whom it may concern:*

Be it known that I, JOSHUA M. HAMMILL, a citizen of the United States, and a resident of Philadelphia, Pennsylvania, have invented an Improvement in Non-Conducting Compounds, of which the following is a specification.

The object of my invention is to provide a compound which shall possess very good non-conducting properties, shall be very light, and when mixed with water for application to the surface to be protected shall adhere with tenacity. This object I attain by employing what is known as "mineral pulp" as the basis of my compound, and I mix this with flour or equivalent adhesive material, and preferably, also, some fibrous material, such as sawdust, paper screenings, wool, asbestus, cotton, or other fibrous material. This mineral pulp is a species of talc, that which is preferred being obtained from the Adirondack region of the State of New York. The component parts of an average specimen have been found to be silica 62.12, magnesia 32.94, and water 4.94. Mineral pulp in its chemical constitution thus seems to be related to asbestus; but in practical application the two substances are found to be very different. In practice I find that I cannot make a non-conducting compound in the manner I propose if asbestus be substituted for mineral pulp, and this seems to be principally due to the fact that asbestus does not possess the adhesive qualities which mineral pulp does, and that the latter is from twenty-five to fifty per cent. a better non-conductor than the former.

In preparing my non-conducting compound the ingredients are divided as finely as possible and mixed dry, so as to form a compound which can be readily stored or transported in its dry state without deterioration or injury to its surroundings, and which, being comparatively very light, can be handled with ease in large quantities.

The compound is prepared for use by the addition of water thereto, and is thereby formed into a plastic adhesive compound, which can be applied to surfaces of iron, stone, or wood, upon which, when dry, it forms a hard light non-conducting layer or covering.

The figure in the accompanying drawing shows a section of a steam-pipe, A, coated with a layer, B, of my improved compound.

A serviceable compound has been made of six parts, by weight, of mineral pulp, three parts of sawdust, and one part of rye-flour; but these proportions may be varied, and where greater tenacity in the compound is desired, wool, cotton, asbestus, or other fibrous, material may be used in place of the sawdust or in addition thereto.

I claim as my invention—

1. A non-conducting compound having the herein-described mineral pulp as a base, as set forth.

2. The within-described non-conducting composition, consisting of a mixture of mineral pulp, flour, and fibrous material, as set forth.

In testimony whereof I have signed my name to this specification in the presence of two subscribing witnesses.

JOSHUA M. HAMMILL.

Witnesses:
HARRY L. ASHENFELTER,
HARRY SMITH.